(12) United States Patent
Turbide

(10) Patent No.: US 10,388,006 B2
(45) Date of Patent: Aug. 20, 2019

(54) SYNTHETIC APERTURE IMAGING ASSISTED BY THREE-DIMENSIONAL SCANNING IMAGING FOR HEIGHT RECONSTRUCTION

(71) Applicant: INSTITUT NATIONAL D'OPTIQUE, Québec (CA)

(72) Inventor: Simon Turbide, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 177 days.

(21) Appl. No.: 15/610,210

(22) Filed: May 31, 2017

(65) Prior Publication Data
US 2018/0348361 A1 Dec. 6, 2018

(51) Int. Cl.
*G06T 5/50* (2006.01)
*G01S 17/89* (2006.01)
*G01S 17/42* (2006.01)
*G01S 7/481* (2006.01)
*G01S 13/86* (2006.01)
*G01S 13/90* (2006.01)

(52) U.S. Cl.
CPC ............. *G06T 5/50* (2013.01); *G01S 7/4814* (2013.01); *G01S 7/4816* (2013.01); *G01S 13/865* (2013.01); *G01S 13/90* (2013.01); *G01S 13/9023* (2013.01); *G01S 17/42* (2013.01); *G01S 17/89* (2013.01); *G01S 17/895* (2013.01); *G06T 2207/10028* (2013.01); *G06T 2207/10044* (2013.01)

(58) Field of Classification Search
None
See application file for complete search history.

(56) References Cited

U.S. PATENT DOCUMENTS 6,559,932 B1 * 5/2003 Halmos ................. G01S 17/107
356/28.5
8,842,036 B2 * 9/2014 Pritt ..................... G01S 13/9035
342/179

(Continued)

OTHER PUBLICATIONS

Baumann, E. et al., "Comb-calibrated laser ranging for three-dimensional surface profiling with micrometer-lever precision at a distance", Optics Express, 22(21): 24914-24928 (Oct. 2014).

(Continued)

*Primary Examiner* — Tamara L Weber
(74) *Attorney, Agent, or Firm* — Merchant & Gould P.C.

(57) ABSTRACT

Synthetic aperture (SA) imaging methods and systems are assisted by three-dimensional (3D) beam scanning imaging, for example scanning lidar. The methods can include concurrently acquiring an SA image and a 3D scanning image of a target region, determining an elevation map of the target region from the 3D scanning image, and processing the SA image based on the elevation map to provide or enhance 3D imaging capabilities in the SA image. In some implementations, the SA image is a two-dimensional (2D) SA image and the elevation map is used to orthorectify the 2D SA image. In other implementations, the SA image is a phase-wrapped 3D SA image resulting from the combination of two or more 2D SA images and the elevation map is used to perform phase unwrapping on the phase-wrapped 3D SA image.

15 Claims, 8 Drawing Sheets

(56) References Cited

U.S. PATENT DOCUMENTS

| | | | |
|---|---|---|---|
| 9,001,116 B2* | 4/2015 | Ben-David | G06T 17/05 |
| | | | 345/419 |
| 9,134,414 B2* | 9/2015 | Bergeron | G01S 13/9035 |
| 2011/0273585 A1* | 11/2011 | Stirling-Gallacher | ........................ |
| | | | G01S 7/411 |
| | | | 348/227.1 |
| 2016/0084946 A1* | 3/2016 | Turbide | G01S 7/497 |
| | | | 356/4.01 |
| 2017/0031012 A1* | 2/2017 | Hairston | G01S 7/497 |
| 2018/0224547 A1* | 8/2018 | Crouch | G01S 17/102 |

OTHER PUBLICATIONS

Chen, X-T. et al., "INSAR Flat-earth Phase Removal Approach Based on DEM to Settlement Area", ITM Web of Conferences 7 (2016).

Crouch, S. et al., "Laboratory demonstractions of interferometric and spotlight synthetic aperture ladar techniques", Optics Express, 20(22): 24237-24246 (2012).

Richards, M.A., "A Beginner's Guide to Interferometric SAR Concepts and Signal Processing", IEEE A&E Systems Magazine, 22(9—Part 2: Tutorials): 5-29 (2007).

\* cited by examiner

SYNTHETIC APERTURE IMAGING ASSISTED BY THREE-DIMENSIONAL SCANNING IMAGING FOR HEIGHT RECONSTRUCTION

TECHNICAL FIELD

The technical field generally relates to synthetic aperture (SA) imaging and, more particularly, to height reconstruction techniques for implementation in SA imaging systems.

BACKGROUND

Synthetic aperture (SA) imaging can be used to increase resolution beyond the diffraction limit of a physical aperture of an imaging system. In SA imaging systems, a large "virtual" aperture is synthesized by illuminating a target region with electromagnetic signals transmitted from a moving platform and collecting phase-coherent return echoes produced by reflection of the electromagnetic signals from the target region. The return echoes are recorded and then coherently combined using signal processing techniques to reconstruct a high-resolution image of the target region. SA imaging was initially developed and has been successfully employed at radio frequencies, where it is referred to as "synthetic aperture radar" (SAR). Conventional SAR systems typically operate in the centimeter (cm) wavelength range and produce images with azimuth resolutions of the order of a decimeter (dm) to a meter (m). As resolution is generally inversely proportional to the imaging wavelength, there has been a growing interest to extend SAR to shorter wavelengths. In this context, an emerging technology referred to as "synthetic aperture ladar" (SAL) has been developed to extend SAR to visible and near-infrared frequencies.

SA imaging systems provide two-dimensional (2D) SA images representing projected ground surface reflectance. A 2D SA image can be represented as a two-dimensional complex-valued array of pixels, where each pixel has an amplitude value and a phase value. The two dimensions of the 2D SA image are the azimuth and the slant-range directions. For a target region having a non-flat topography, an ambiguity exists between ground range and height since various pairs of ground-range and height values may lead to a same slant-range value.

An approach to remove this ambiguity and provide three-dimensional (3D) imaging of a target region is known as "interferometric SA imaging", referred to as IFSAR and IFSAL depending on the operating wavelength. In this technique, two 2D SA images are acquired from different points of view relative to the target region. The 2D SA images are co-registered and interfered with each other, and an elevation map of the target region is extracted from their phase difference. A challenge in implementing interferometric SA imaging is that the height reconstruction process involves phase unwrapping, which can suffer from robustness limitations. This is especially true in the case of IFSAL, since the conditions on phase accuracy and platform stability required for interferometry become increasingly stringent as the wavelength decreases. Another challenge is that since a 2D SA image involves the projection of a 3D target region onto a 2D image plane, slant-range distortion effects such as foreshortening and layover can appear for target regions with irregular topography.

Laser-based scanning techniques such as scanning lidar provide another approach to achieving 3D imaging of a target region. These techniques can be implemented using various distance measurement methods, including time-of-flight, phase-shift, and frequency modulation methods. However, although laser-based scanning techniques can provide 3D images, their spatial resolution is limited by the size of the beam illuminating the target region.

SUMMARY

In accordance with an aspect, there is provided a method for synthetic aperture (SA) imaging of a target region from a platform in relative movement with respect to the target region along a travel path. The method includes:
  illuminating the target region with an SA transmission beam transmitted from the platform, and receiving, on the platform, an SA return signal produced by reflection of the SA transmission beam from the target region;
  generating an initial two-dimensional (2D) SA image of the target region from the SA return signal, the initial 2D SA image having an across-track dimension measured in slant-range coordinate;
  scanning, concurrently with illuminating the target region with the SA transmission beam, the target region with a scanning beam transmitted from the platform, and receiving, on the platform, a scanning return signal produced by reflection of the scanning beam from the target region;
  generating a three-dimensional (3D) scanning image of the target region from the scanning return signal, and determining an elevation map of the target region from the 3D scanning image; and
  orthorectifying the initial 2D SA image based on the elevation map to obtain an orthorectified 2D SA image having an across-track dimension measured in ground-range coordinate.

In accordance with another aspect, there is provided a system for synthetic aperture (SA) imaging of a target region from a platform in relative movement with respect to the target region along a travel path. The system includes:
  a source assembly mounted on the platform and configured to generate an SA transmission beam and a scanning beam;
  a transmitter-receiver assembly mounted on the platform and including:
    an SA transmitter illuminating the target region with the SA transmission beam;
    a scanning transmitter scanning the target region with a scanning beam; and
    a receiver unit receiving an SA return signal and a scanning return signal, respectively produced by reflection of the SA transmission beam and the scanning beam from the target region;
  a detector assembly mounted on the platform and configured to detect the SA return signal and the scanning return signal received by the receiver unit; and
  a processing unit coupled to the detector assembly and configured to:
    generate an initial two-dimensional (2D) SA image of the target region from the SA return signal, the initial 2D SA image having an across-track dimension measured in slant-range coordinate;
    generate a three-dimensional (3D) scanning image of the target region from the scanning return signal;
    determine an elevation map of the target region from the 3D scanning image; and orthorectify the initial 2D SA image based on the elevation map to obtain an orthorectified 2D SA image having an across-track dimension measured in ground-range coordinate.

In accordance with another aspect, there is provided a method for synthetic aperture (SA) imaging of a target region from a platform in relative movement with respect to the target region along a travel path. The method includes:

acquiring two or more two-dimensional (2D) SA images of the target region, and combining the two or more 2D SA images to obtain a phase-wrapped three-dimensional (3D) SA image of the target region;

scanning, concurrently with acquiring the two or more 2D SA images, the target region with a scanning beam transmitted from the platform, and receiving, on the platform, a scanning return signal produced by reflection of the scanning beam from the target region;

generating a 3D scanning image of the target region from the scanning return signal, and determining an elevation map of the target region from the 3D scanning image; and unwrapping the phase-wrapped 3D SA image based on the elevation map to obtain a phase-unwrapped 3D SA image.

In accordance with another aspect, there is provided a system for synthetic aperture (SA) imaging of a target region from a platform in relative movement with respect to the target region along a travel path. The system includes:

a source assembly mounted on the platform and configured to generate two SA transmission beams and a scanning beam;

a transmitter-receiver assembly mounted on the platform and including:
  a first SA transmitter illuminating the target region with a first SA transmission beam, and a second SA transmitter illuminating the target region with a second SA transmission beam, the second SA transmitter being separated from the first SA transmitter by a baseline distance;
  a scanning transmitter scanning the target region with a scanning beam; and
  a receiver unit receiving a first SA return signal, a second SA return signal and a scanning return signal, respectively produced by reflection of the first SA transmission beam, the second SA transmission beam and the scanning beam from the target region;

a detector assembly mounted on the platform and configured to detect the first SA return signal, the second SA return signal and the scanning return signal received by the receiver unit; and a processing unit coupled to the detector assembly and configured to:
  generate first and second two-dimensional (2D) SA images of the target region respectively from the first and second SA return signals, and combine the first and second 2D SA images to obtain a phase-wrapped three-dimensional (3D) SA image of the target region;
  generate a 3D scanning image of the target region from the scanning return signal, and determine an elevation map of the target region from the 3D scanning image; and
  unwrap the phase-wrapped 3D SA image based on the elevation map to obtain a phase-unwrapped 3D SA image.

Other features and advantages of the present description will become more apparent upon reading of the following non-restrictive description of specific embodiments thereof, given by way of example only with reference to the appended drawings.

DETAILED DESCRIPTION

Figure 1:
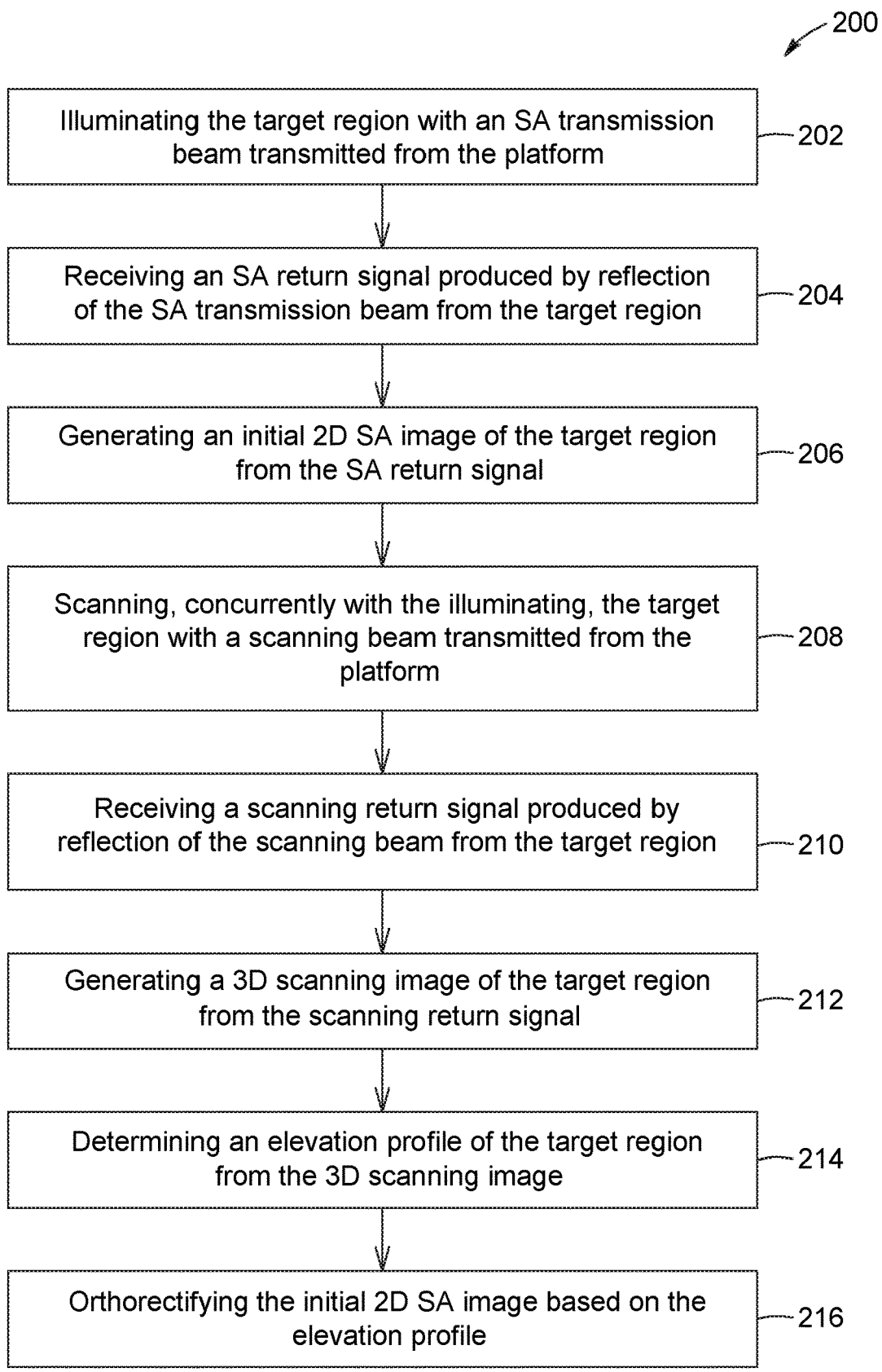
FIG. 1 is a flow diagram of a method for SA imaging, in accordance with a possible embodiment.

In the following description, similar features in the drawings have been given similar reference numerals and, to not unduly encumber the figures, some elements may not be indicated on some figures if they were already identified in a preceding figure. It should also be understood herein that the elements of the drawings are not necessarily depicted to scale, since emphasis is placed upon clearly illustrating the elements and structures of the present embodiments.

The present description generally relates to methods for synthetic aperture (SA) imaging and to imaging systems capable of implementing the methods. Broadly stated, the present techniques use three-dimensional (3D) beam scanning imaging, for example 3D scanning lidar, to provide or enhance 3D imaging capabilities in SA imaging. In some implementations, the method can include concurrently acquiring an SA image and a 3D scanning image of a target region, determining an elevation map of the target region from the 3D scanning image, and processing the SA image based on the elevation map thus determined. For example, in some implementations, the SA image is a two-dimensional (2D) SA image and the elevation map is used to orthorectify the 2D SA image. In other implementations, the SA image is a 3D SA image and the elevation map is used to perform phase unwrapping on the 3D SA image. The present techniques can be implemented in an imaging system mounted on a platform in relative movement with respect to the target region. In some implementations, the imaging system can include a single optical source that generates all the optical beams used to illuminate or scan the target region.

In the present description, a 2D SA image of a target region refers to a 2D pixel array having an along track dimension and an across-track dimension. Each pixel of the array is associated with a respective area of the target region and provides a complex number (amplitude and phase information) representing the surface reflectance of the associated area. Meanwhile, a 3D image of a target region, for example a 3D scanning image or a 3D SA image, also refers to a 2D pixel array having an along track dimension and an across-track dimension and where each pixel of the array is associated with a respective area of the target region. However, rather than providing reflectance-based information, each pixel of the 3D image has a value representative of the local height or elevation of the associated area of the target region.

The present techniques can be used in SA ladar (SAL) applications employing wavelengths in the visible or near-infrared portions of the electromagnetic spectrum. Those skilled in the art will recognize, however, that the present techniques can also be applied to other types of SA imaging modalities, including, but not limited to, SA radar (SAR) imaging, SA terahertz imaging and SA infrared imaging. In the present description, the terms "light" and "optical" are used to refer to radiation in any appropriate region of the electromagnetic spectrum, for example, the radio, microwave, terahertz, infrared, visible and ultraviolet wavelength ranges. For example, in SAL applications, the terms "light" and "optical" can encompass electromagnetic radiation having a wavelength ranging from a few hundreds of nanometers (nm) to a few micrometers (µm).

Referring to FIG. 1, there is provided a flow diagram of an embodiment of a method 200 for SA imaging of a target region from a platform in relative movement with respect to the target region along a travel path. The method 200 generally involves the acquisition of two images of the target region: an initial 2D SA image and a 3D scanning image. As will be described, the 3D scanning image is used to determine an elevation map of the target region, which in turn is used to orthorectify the initial 2D SA image.

Figure 2:
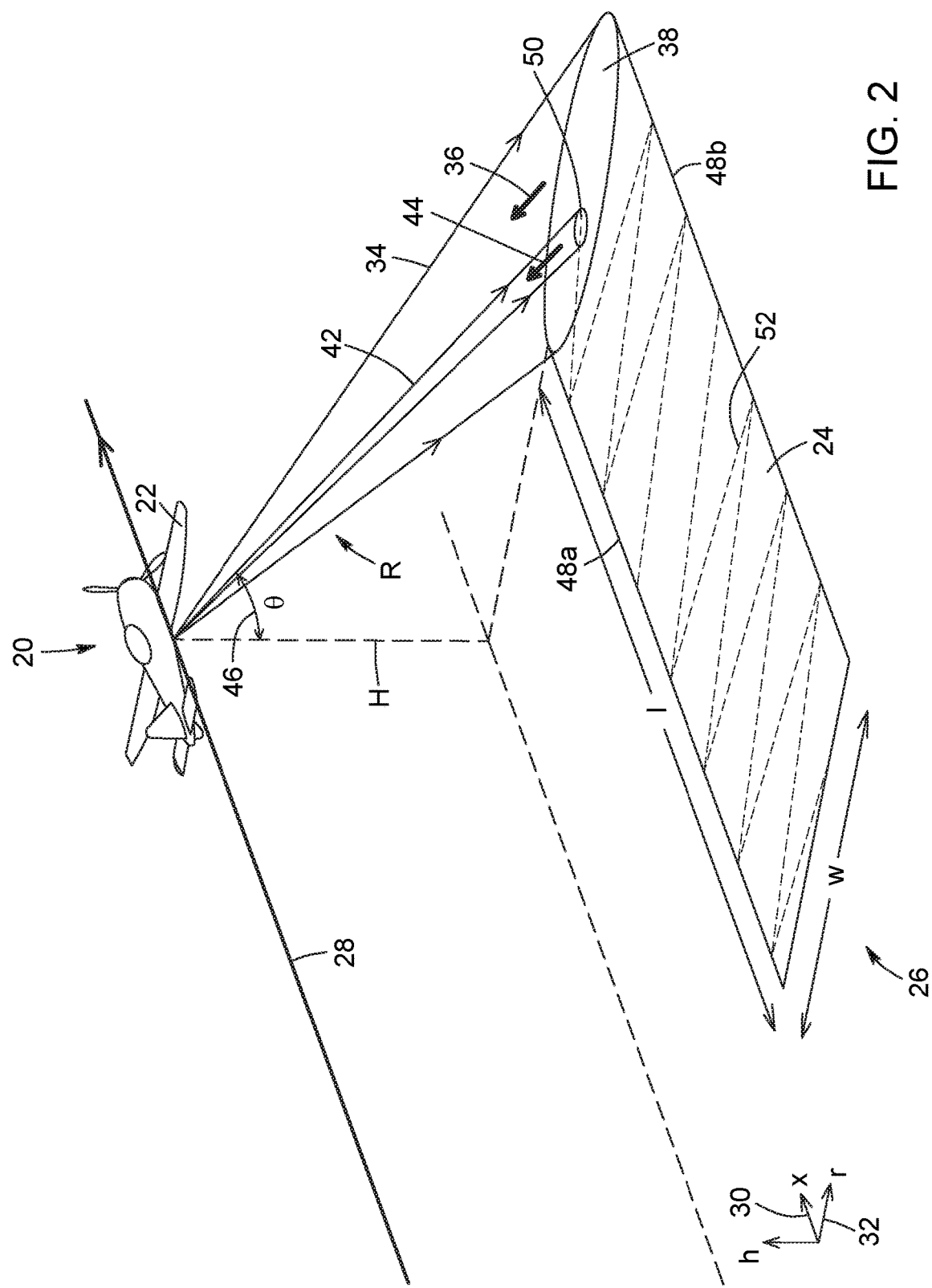
FIG. 2 is a schematic perspective view of an SA imaging system mounted on a platform in relative movement with respect to a target region, in accordance with a possible embodiment.

The method 200 of FIG. 1 can be implemented in an imaging system 20 mounted on a platform 22 that moves with respect to a target region 24 of a scene 26, such as illustrated in FIG. 2. In this embodiment, the platform 22 moves along a travel path 28 at an altitude H above the target region 24. The target region 24 corresponds to an area or feature of interest in the scene 26, for example a ground surface of the Earth. The target region 24 has a length l along an azimuth, or along-track, direction 30 parallel to the travel path 28, and a width w along a ground-range direction 32 perpendicular to the azimuth direction 30. For example, in some embodiments, the width w of the target region 24 can range between 0.5 m and 5 m, while the length l of the target region 24 can range between 10 m and 1000 m. In the illustrated embodiment, the platform 22 is an airplane that travels over a stationary target region 24. However, various other types of manned or unmanned airborne, spaceborne and terrestrial vehicles could be used in other embodiments. Moreover, in other embodiments, it can be the target region that moves with respect to the platform, while in yet other embodiments, both the platform and the target region can move.

Referring still to both FIGS. 1 and 2, the method 200 includes a step 202 of illuminating the target region 24 with an SA transmission beam 34 transmitted from the platform 22, and a step 204 of receiving, on the platform, an SA return signal 36 produced by reflection of the SA transmission beam 34 from the target region 24. The method 200 also includes a step 206 of generating an initial 2D SA image $S_{SA,2D}(R, x)$ of the target region 24 from the SA return signal. The initial 2D SA image $S_{SA,2D}(R, x)$ has an across-track dimension measured in slant-range coordinate R and an along-track measured in azimuth coordinate x. In FIG. 2, the SA transmission beam 34 illuminates the target region 24 in a zero-squint side-looking stripmap mode. In this mode, the platform 22 moves along the azimuth direction 30 and the SA transmission beam 34 points perpendicularly to the travel path 28 along a slant-range direction. Other SA operation modes can be used in other variants, for example a scanning mode, a spotlight mode, and a forward- or backward-squinted side-looking stripmap mode.

The area of the scene 26 illuminated by the SA transmission beam 34 at a given time, corresponding to a given position of the platform 22 along its travel path 28, is referred to as the footprint 38 of the SA transmission beam 34. As the platform 22 moves along the travel path 28, the footprint 38 of the SA transmission beam 34 moves accordingly, thereby illuminating a swath that defines the target region 24. In some implementations, the SA transmission beam footprint 38 can have a ground-range extent that ranges between 0.5 m and 5 m, and an azimuth-extent that ranges between 0.1 m and 2 m.

The step 206 of generating the initial 2D SA image $S_{SA,2D}(R, x)$ of the target region 24 from the SA return signal 36 can involve recording the SA return signal 36 as a series of phase-coherent return echoes, and then coherently combining the return echoes using appropriate signal extraction and processing techniques to generate the initial 2D SA image $S_{SA,2D}(R, x)$. The general principles underlying the generation of SA images are known in the art, and need not be covered in detail herein.

Figure 3:
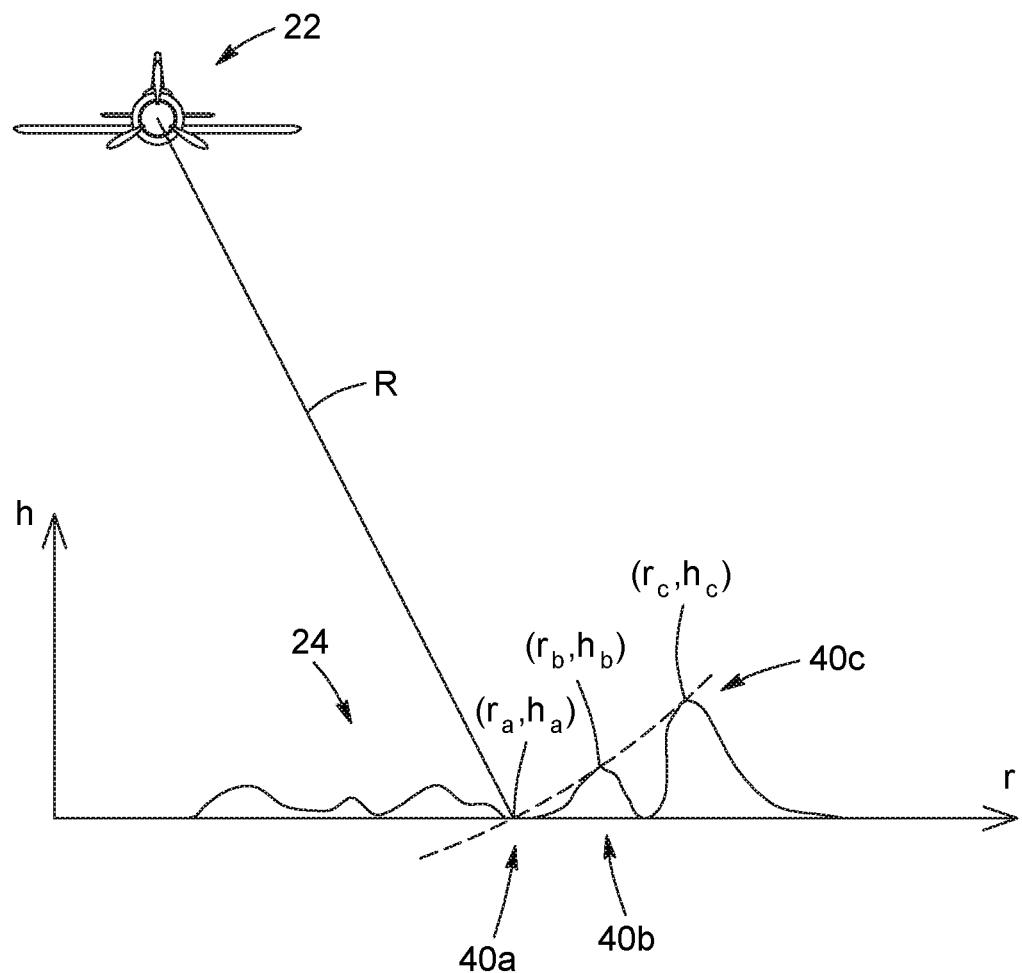
FIG. 3 is a schematic front view of an SA imaging system, illustrating an ambiguity that may exist in determining the combination of ground range and elevation values that corresponds to a given measured slant range value.

The fact that the across-track dimension of the initial 2D SA image $S_{SA,2D}(R, x)$ is along the slant-range direction R, rather than along the ground-range direction r, can cause image distortions. For example, for a non-flat target region, an ambiguity exists between ground range and elevation, since various pairs of ground-range and elevation values (r, h) can be compatible with a given slant-range value R. This is illustrated in FIG. 3, which shows three features 40a to 40c of a target region 24 having different ground ranges $r_a$, $r_b$, $r_c$, and heights $h_a$, $h_b$ and $h_c$, but the same slant-range distance R to an airborne platform 22. Other examples of distortion effects caused by the side-looking SA viewing geometry include foreshortening, layover and shadowing. A slant-range-based SA image can be transformed into a ground-range-based SA image by correcting each pixel of the image for the local topography of the target region. The present techniques provide a manner of obtaining information about the local topography of a target region and using this information to correct slant-range-based 2D SA images.

Returning to FIGS. 1 and 2, the method 200 further includes a step 208 of scanning, concurrently with the step 202 of illuminating, the target region 24 with a scanning beam 42 transmitted from the platform 22, and a step 210 of receiving, on the platform 22, a scanning return signal 44 produced by reflection of the scanning beam 42 from the target region 24. The method 200 also includes a step 212 of generating a 3D scanning image of the target region 24 from the scanning return signal 44. In the present description, the term "concurrently" refers to two processes that occur during coincident or overlapping time periods. It should be noted that the term "concurrently" does not necessarily imply complete synchronicity and encompasses various scenarios including: time-coincident occurrence of two processes; occurrence of a first process that both begins and ends during the duration of a second process; and occurrence of a first process that begins during the duration of a second process, but ends after the completion of the second process.

The scanning of the target region 24 can involve sweeping the scanning beam 42 across the target region 24 along a scanning path 46. The scanning beam 42 can be made of any suitable type of electromagnetic waves. In some implementations, the scanning beam 42 can be a collimated laser beam in the near-infrared or short-wave infrared. The scanning of the target region 24 can be implemented with a scanning lidar or another scanning-based optical ranging technology. In the present description, the term "scan" and derivatives thereof refer to the fact that the scanning beam 42 is guided in a point-by-point manner over the target region 24 not only because of the relative movement between the target region 24 and the platform 22, as in SA imaging, but also because of the time-variation of the scanning angle θ of the scanning beam 42 with respect to the vertical to the platform 22 itself. The beam scanning can be achieved by means of a mirror-based or another scanning technology. In the embodiment of FIG. 2, the imaging system 20 is configured to sweep the scanning beam 42 back and forth between a near edge 48a and a far edge 48b of the target region 24, which involves continuously changing the scanning angle θ, or pointing direction, of the scanning beam 42 over a certain range of scanning angles in a plane perpendicular to the azimuth direction 30 in the reference frame of the moving platform 22. Of course, various types of scanning patterns can be used in other embodiments.

The area of the scene 26 that is illuminated by the scanning beam 42 at a given time, corresponding to a given position of the platform 22 along its travel path 28 and a given scanning angle θ of the scanning beam 42 along its scanning path 46, defines a footprint 50 of the scanning beam 42. The footprint 50 of the scanning beam 42 is typically much smaller than the footprint 38 of the SA transmission beam 34, since the smaller the footprint 50 of the scanning beam 42, the better the resolution of the 3D scanning image. For example, the footprint 50 of the scanning beam 42 can have a ground-range extent that ranges between 1 millimeter (mm) and 10 cm, and an azimuth-extent that ranges between 1 mm and 10 cm. Due to the combination of the sweeping of the scanning beam 42 along the ground-range direction 32 and the relative motion of the platform 22 along the azimuth direction 30, the footprint 50 of the scanning beam 42 forms a 2D scanning trace 52 over the target region 24. For example, the scanning trace 52 in the embodiment of FIG. 2 has a zigzag shape and a ground-range extent that substantially matches the width w of the target region 24. It is to be noted that while in the illustrated embodiment the footprint 50 of the scanning beam 42 remains inside the footprint 38 of the SA transmission beam 34 throughout the scanning process, this need not be the case in other embodiments.

The step 212 of generating the 3D scanning image of the target region 24 from the scanning return signal 44 can involve recording the received scanning return signal 44 as a spatially distributed pattern of target returns. Each target return forming the scanning return signal 44 constitutes a range measurement at a specific azimuth position x of the platform 22 along its travel path 28 and a specific scanning angle θ of the scanning beam 42 along its scanning path 46. By combining the range measurements with time-dependent measurements of the absolute position and orientation of the platform 22, a 3D scanning image $S_{scan}(x, \theta)$ of the target region 24 can be generated. The absolute position and orientation of the platform 22 can be measured using a global positioning system (GPS) and an inertial measurement unit (IMU). The 3D scanning image $S_{scan}(x, \theta)$ can be represented as a 2D pixel array having an azimuth dimension x and a scanning-angle dimension θ, in which each pixel has a value representing the slant range R measured at the azimuth and scanning-angle coordinates of the pixel. It is to be noted that while the 3D scanning image has a spatial resolution typically lower than that of the initial 2D SA image, it has the benefit of providing 3D rather than 2D imaging capabilities. The general principles underlying the generation of 3D scanning images using a scanning beam swept across a target region are known in the art, and need not be covered in detail herein.

Referring still to FIGS. 1 and 2, the method 200 further includes a step 214 of determining an elevation map h(R, x) of the target region 24 from the 3D scanning image $S_{scan}(x, \theta)$. The elevation map h(R, x) provides a 3D representation of the surface of the target region 24. Determining the elevation map h(R, x) of the target region 24 from knowledge of the 3D scanning image $S_{scan}(x, \theta)$ and the altitude H of the platform 22 along the travel path 28 is straightforward using simple trigonometry, as is projecting the elevation map h(R, x) into ground-range coordinate to yield h(r, x). More detail will be provided about possible system implementations before describing how the elevation map h(r, x) can be used to correct the initial 2D SA image $S_{SA,2D}(R, x)$.

Figure 4:
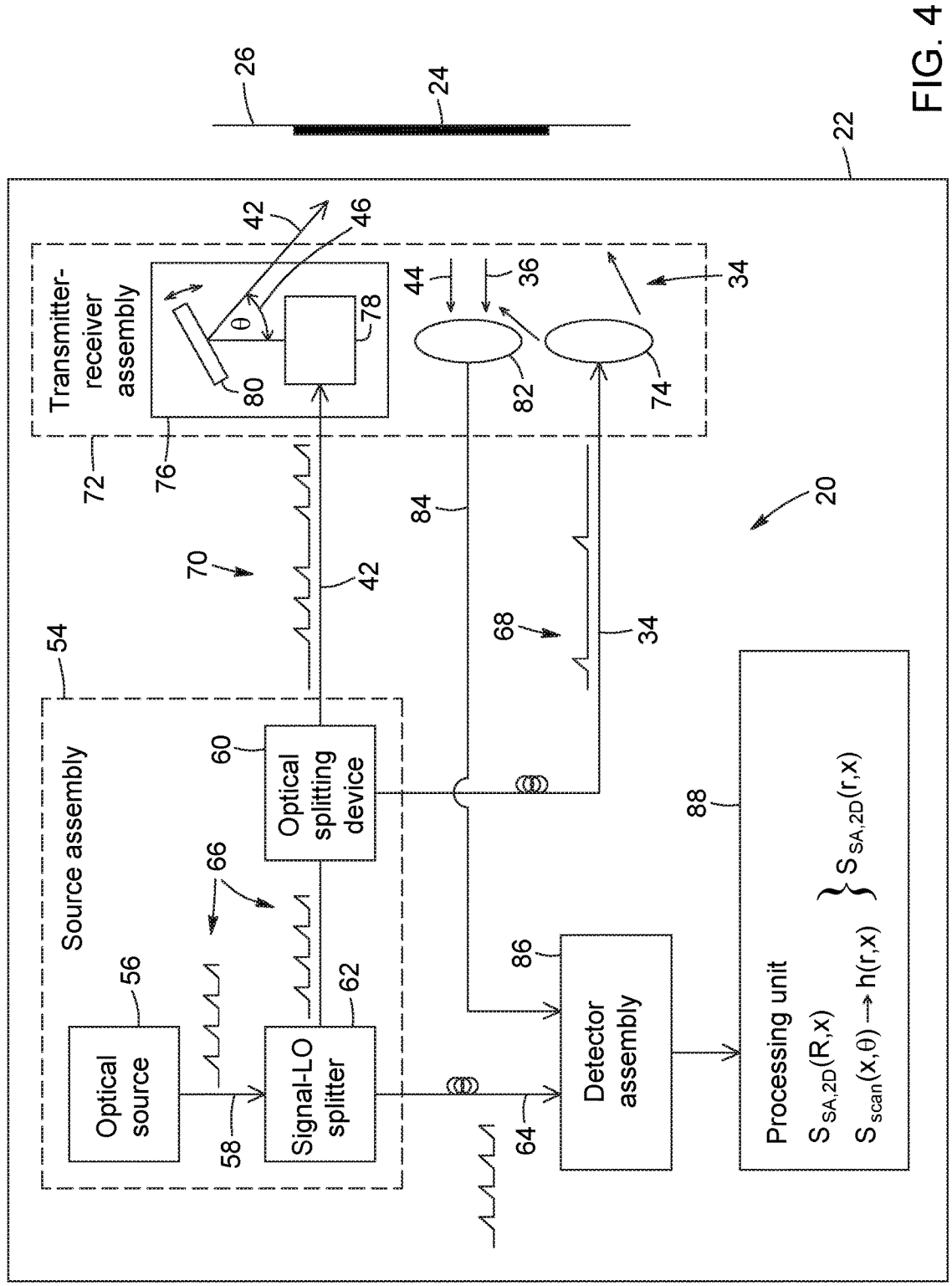
FIG. 4 is a schematic block diagram of an SA imaging system with beam scanning imaging capabilities, in accordance with another possible embodiment.

Referring to FIG. 4, there is provided a schematic block diagram of an embodiment of an imaging system 20 configured for SAL applications, for example in the near-infrared, and enabling 3D scanning imaging, for example scanning lidar technology. The imaging system 20 can correspond to that illustrated in FIG. 2, and can be used to implement the method 200 of FIG. 1.

The imaging system 20 of FIG. 4 includes a source assembly 54 mounted on the platform 22. The source assembly 54 includes an optical source 56 that generates a source optical signal 58, and an optical splitting device 60 that splits that source optical signal 58, or a portion thereof, into the SA transmission beam 34 and the scanning beam 42. It is to be noted that in other implementations, the SA transmission beam 34 and the scanning beam 42 can be generated by different optical sources, which may or may not operate in the same portion of the electromagnetic spectrum. Depending on the application, the SA transmission beam 34 and the scanning beam 42 may or may not be phase-coherently synchronized with each other. In FIG. 2, the source assembly 54 also includes a signal-local oscillator (LO) splitter 62 upstream of the optical splitting device 60 to extract a portion of the source optical signal 58 to be used as an LO signal 64 in the detection process, as described below. In other embodiments, the source optical signal 58 and the LO signal 64 can be generated by different optical sources. The embodiment of FIG. 2 transmits the SA transmission beam 34 and the scanning beam 42 using optical fibers, but other embodiments can use bulk optical components.

The optical source 56 can be embodied by any appropriate device or combination of devices apt to generate a source optical signal from which an SA transmission beam and a scanning beam, suitable respectively for SA imaging and 3D scanning imaging, can be generated. By way of example, in SAL applications assisted by scanning lidar, both the SA transmission beam 34 and the scanning beam 42 can have a center frequency ranging from about 30 terahertz (THz) to about 300 THz, for example 193 THz, corresponding to a wavelength of 1.55 μm. Non-limiting examples for the optical source 56 include a gas laser, a solid-state laser, a diode laser, a dye laser, and a non-laser source. For SAL applications, the optical source 56 is generally a laser source. For example, in some implementations, the optical source 56 can be embodied by a pulsed fiber laser provided with a directly modulated laser diode configured to perform a linear or nonlinear frequency modulation, or chirp, of the source optical signal 58. Alternatively, the source optical signal 58 can be a continuous-wave optical source whose output is coupled to an external waveform modulator or phase shifter. It is to be noted that using chirped signals in combination with a coherent detection scheme (e.g., optical heterodyne detection) can improve the range resolution in both SA and 3D scanning imaging. In FIG. 4, the SA transmission beam 34 and the scanning beam 42 have the same linear chirp waveform inherited from the source optical signal 58. In some implementations, the SA transmission beam 34 and/or the scanning beam 42 can also or alternatively be individually modulated or otherwise conditioned downstream of the optical splitting device 60.

In the present description, the term "optical splitting device" is intended to refer to a device capable of dividing an input optical signal into two or more signal parts. The signal parts may or may not be all identical. In some implementations, the optical splitting device is configured to perform either a power splitting or a spectral splitting of the input optical signal. In other implementations, the optical splitting device is configured to perform a time-based splitting of the input optical signal, in which the input optical signal is divided temporally into the two or more signal parts.

For example, in the embodiment of FIG. 4, the optical splitting device 60 is configured to perform a time-based splitting of the source optical signal 58 to generate the SA transmission beam 34 and the scanning beam 42. The source optical signal 58 is emitted as a series of linearly chirped laser pulses 66 at a pulse repetition rate of N pulses per second, for example between a few pulses and a few thousands of pulses per second. The pulse duration can range from a few nanoseconds to a few microseconds. From each sequence of N pulses 66, $N_{SA}$ pulses 68 are selected to form the SA transmission beam 34 and $N_S=N-N_{SA}$ pulses 70 are selected to form the scanning beam 42. For ease of illustration, the ratio $N_S/N_{SA}$ is equal to three in FIG. 4. In practice, $N_S$ is often larger than $N_{SA}$, that is, $N_S/N_{SA}$ can range from 1 to 20.

Referring still to FIG. 4, the imaging system 20 includes a transmitter-receiver assembly 72 mounted on the platform 22. The transmitter-receiver assembly 72 can include an SA transmitter 74 for illuminating the target region 24 with the SA transmission beam 34 and a scanning transmitter 76 for scanning the target region 24 with the scanning beam 42. The transmitters 74, 76 can include appropriate optics to shape or condition the SA transmission beam 34 and the scanning beam 42. More specifically, the scanning transmitter 76 can include collimating optics 78 to collimate the scanning beam 42, and a scanning device 80, for example a lidar scanning device, to scan the collimated scanning beam 42 back and forth widthwise across the target region 24. By collimating the scanning beam 42, its footprint on the target region 24 can be made smaller. In the illustrated embodiment, the scanning device 80 includes a fast steering mirror, but other mirror-based or non-mirror-based scanning technologies can be used in other embodiments. The orientation of the scanning device 80 is continuously swept in time over a range of possible orientations along the scanning path 46, thus effectively changing the pointing direction of the scanning beam 42.

Referring still to FIG. 4, the transmitter-receiver assembly 72 can also include a receiver unit 82 configured to receive the SA return signal 36 and the scanning return signal 44. The receiver unit 82 can include appropriate receiving optics, for example lens, mirrors or optical filters, to collect the SA return signal 36 and the scanning return signal 44. Depending on the application, the receiver unit 82 can be embodied by a single receiver or a plurality of receivers. It is to be noted that the SA return signal 36 and the scanning return signal 44 are generally not discriminated by the receiver unit 82 as separate signals, but rather as a total return signal 84. The respective contributions of the SA return signal 36 and the scanning return signal 44 to the total return signal 84 can be identified later in the detection process, as described below. In the embodiment of FIG. 4, the SA transmitter 74, the scanning transmitter 76 and the receiver unit 82 are depicted as three separate devices, but various other configurations can be used in other embodiments.

Referring still to FIG. 4, the imaging system 20 also includes a detector assembly 86 mounted on the platform 22. The detector assembly 86 is configured to detect the SA return signal 36 and the scanning return signal 44 received by the receiver unit 82. In the illustrated embodiment, the detection process employs optical heterodyne detection with chirped signals. The detector assembly 86 can mix the total return signal 84 with the LO signal 64 on one or more photodetectors, for example PIN or avalanche photodiode detectors. Each photodetector can generate an electrical signal containing two distinct beat frequency bands, one corresponding to the SA return signal 36 and the other corresponding to the scanning return signal 44. For chirped signals, the beat frequencies depend on the optical path length difference, or relative time delay, between the LO and return signals. Controlling the optical path length difference between the SA transmission beam 34 and the scanning beam 42 can therefore facilitate the discrimination of the SA return signal 36 from the scanning return signal 44. The measured electrical signals can be digitally sampled and stored as return signal data. The return signal data can be processed to extract or retrieve SA signal data associated with the SA return signal 36 and scanning signal data associated with the scanning return signal 44. The SA signal data and scanning signal data can in turn be processed to reconstruct the initial 2D SA image $S_{SA,2D}(R, x)$ and the 3D scanning image $S_{scan}(x, \theta)$ of the target region 24.

The imaging system 20 of FIG. 4 also includes a processing unit 88 coupled to the detector assembly 86 and configured, among other things, to: generate the initial 2D SA image $S_{SA,2D}(R, x)$ and the 3D scanning image $S_{scan}(x, \theta)$ from the SA signal data and the scanning signal data, respectively; determine the elevation map h(r, x) of the target region 24 from the 3D scanning image $S_{scan}(x, \theta)$; and, as described below, orthorectify the initial 2D SA image $S_{SA,2D}(R, x)$ using the elevation map h(r, x). The processing unit 88 can be provided as a single unit or as a plurality of interconnected sub-units, and be implemented in hardware, software, firmware or any combination thereof. For example, the processing unit 88 can be embodied by a microprocessor, a central processing unit (CPU), a microcontroller, or by any other processing resource or any combination of such processing resources configured to operate collectively as a processing unit. The SA signal data and the scanning signal data can be transmitted from the detector assembly 86 to the processing unit 88 via wired and/or wireless transmission links. In FIG. 4, the processing unit 88 is physically located on the moving platform 22. However, it can also be envisioned that the processing unit 88 be provided at another location, for example at a ground-based processing station.

Returning to the flow diagram of FIG. 1, the method 200 further includes a step 216 of orthorectifying the initial 2D SA image $S_{SA,2D}(R, x)$ based on the elevation map $h(r, x)$ of the target region to obtain an orthorectified 2D SA image $S_{SA,2D}(r, x)$ having an across-track dimension measured in ground-range coordinate r rather than in slant-range coordinate R. Orthorectification aims to provide an image of the target region as if viewed directly from above. The process can involve performing a mapping into ground-range coordinate r of each pixel of the initial 2D SA image $S_{SA,2D}(R, x)$ mapped in slant-range coordinate R, thus effectively correcting for the local topography of the target region. The process of orthorectification can therefore allow slant-range distortion effects, such as the ambiguity between ground range and elevation illustrated in FIG. 3, to be corrected.

In some implementations, the orthorectifying step 216 can involve co-registering the initial 2D SA image $S_{SA,2D}(R, x)$ and the elevation map $h(r, x)$ to provide a one-to-one correspondence between the pixels of the 2D SA image $S_{SA,2D}(R, x)$ and the pixels of the elevation map $h(r, x)$. In some implementations, image co-registration can involve interpolating either the initial 2D SA image $S_{SA,2D}(R, x)$ or the elevation map $h(r, x)$, typically the latter. The orthorectifying step 216 can also include performing the ground-range projection $r = R\cos(\psi)$ for each pixel of $S_{SA,2D}(R, x)$ to obtain a distorted ground-projected 2D SA image $S_{SA,2D,GP}(r, x)$, where $\psi$ is the nominal depression angle of the SA transmission beam. The orthorectifying step 216 can further include moving the ground-range coordinate of each pixel of $S_{SA,2D,GP}(r, x)$ by $h(r, x)\tan(\psi)$ to obtain the orthorectified 2D SA image $S_{SA,2D}(r, x)$, that is, $S_{SA,2D}(r, x) = S_{SA,2D,GP}(r - h(r, x)\tan(\psi), x)$. It is to be noted that moving each pixel of $S_{SA,2D,GP}(r, x)$ in this manner can involve fractional shifts of the ground-range coordinate, and thus image interpolation.

It is to be noted that acquiring the initial 2D SA image $S_{SA,2D}(R, x)$ and the 3D scanning image $S_{scan}(x, \theta)$ concurrently and from the same or nearly the same perspective on the platform can ease both image co-registration and correction of uncompensated optical-path-length fluctuations caused by unintended platform motion deviations.

Figure 5:
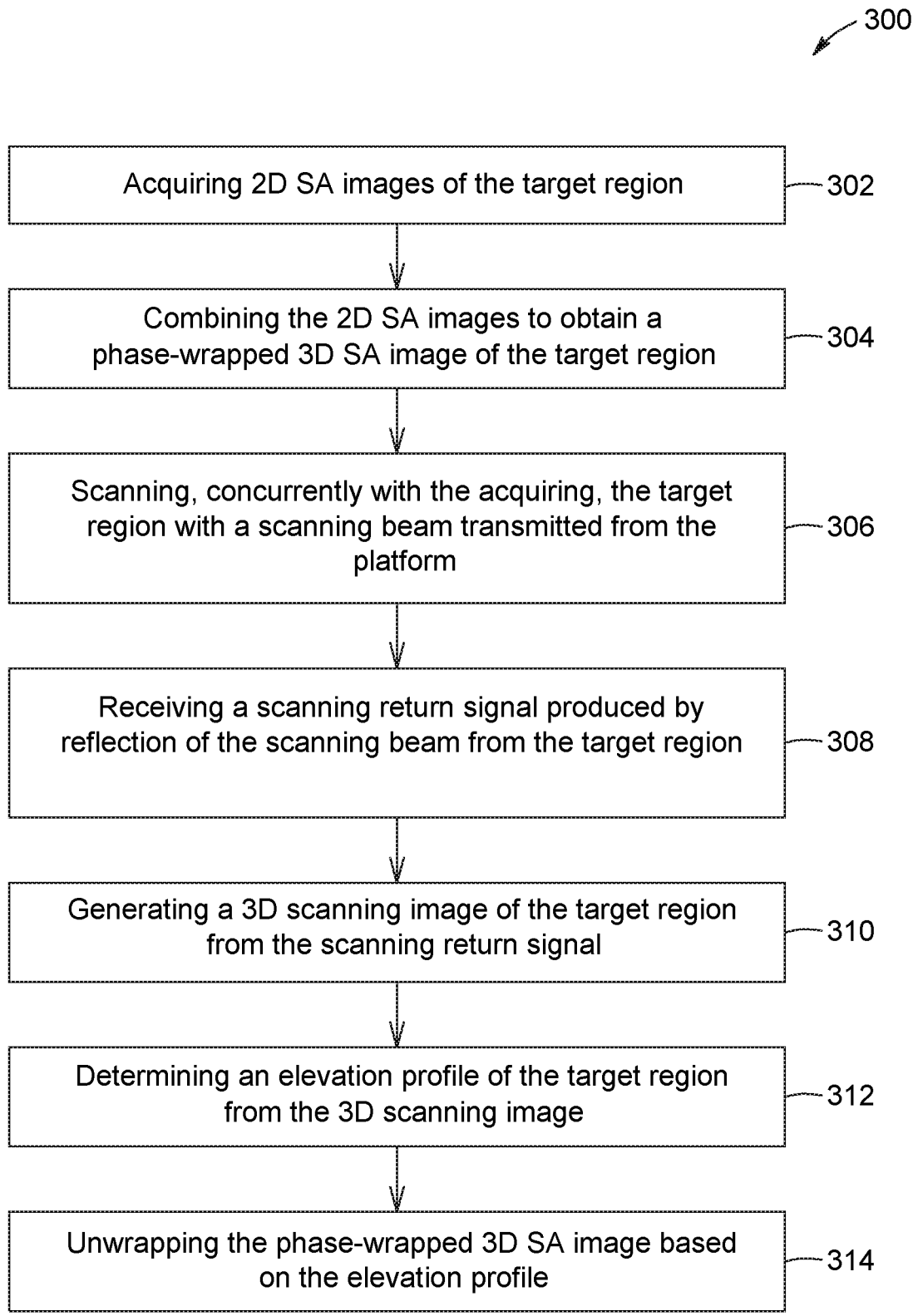
FIG. 5 is a flow diagram of another method for SA imaging, in accordance with a possible embodiment.

Referring now to FIG. 5, there is provided a flow diagram of an embodiment of another SA imaging method 300. The method 300 of FIG. 5 generally involves the generation of two 3D images of a target region: a phase-wrapped 3D SA image and a 3D scanning image. The 3D scanning image is used to determine an elevation map of the target region that is to be used to unwrap the phase-wrapped 3D SA image. The method 300 of FIG. 5 can be implemented in an imaging system 20 such as those illustrated in FIGS. 6 to 8, or in other imaging systems. It is to be noted that the embodiments of FIGS. 5 to 8 share several features with the embodiments described above and illustrated in FIGS. 1, 2 and 4. Such similar features will not be described again in detail other than to highlight differences.

The method 300 of FIG. 5 includes a step 302 of acquiring two or more 2D SA images of the target region, and a step 304 of combining these 2D SA images into a phase-wrapped 3D SA image $S_{SA,3D,PW}(R, x)$ of the target region. The phase-wrapped 3D SA image $S_{SA,3D,PW}(R, x)$ can be represented as a 2D pixel array having an azimuth dimension x and a slant-range dimension R, and in which each pixel provides a wrapped phase value that can be converted to an elevation value by phase unwrapping, as described below. Each 2D SA image can be acquired such as described above, namely by illuminating the target region with an SA transmission beam, receiving an SA return signal produced by reflection of the SA transmission beam from the target region, and generating the 2D SA image from the SA return signal. It is to be noted, however, that there need not be a one-to-one correspondence between the number of 2D SA images and the number of SA transmission beams used to obtain the 2D SA images. In general, the two or more 2D SA images can be acquired using at least one SA transmission beam.

In some implementations, the combining step 304 can use interferometric SA imaging, such as IFSAL when the 2D SA images are SAL images. In such a case, two 2D SA images of a target region can be acquired from two different points of view separated by a baseline distance L in a direction perpendicular to both the beam pointing direction and the travel path. The different points of view introduce phase differences between the two 2D SA images that depend on the topography of the target region. The two 2D SA images are then co-registered and combined into an interferogram by computing, pixel-by-pixel, phase differences between the two images. Such an interferogram represents a phase-wrapped 3D SA image of the target region. Because phase differences can only be measured modulo $2\pi$, an absolute phase ambiguity exists that can be resolved by unwrapping the interferogram to extract the elevation map of the target region. The general principles underlying interferometric SA imaging are known in the art, and need not be covered in detail herein. It is to be noted, however, that the method 300 of FIG. 5 is not limited to interferometric SA imaging, and that other imaging techniques in which a phase-wrapped 3D SA image is obtained from the combination of two or more individual 2D SA images can be used in other implementations.

Figure 6:
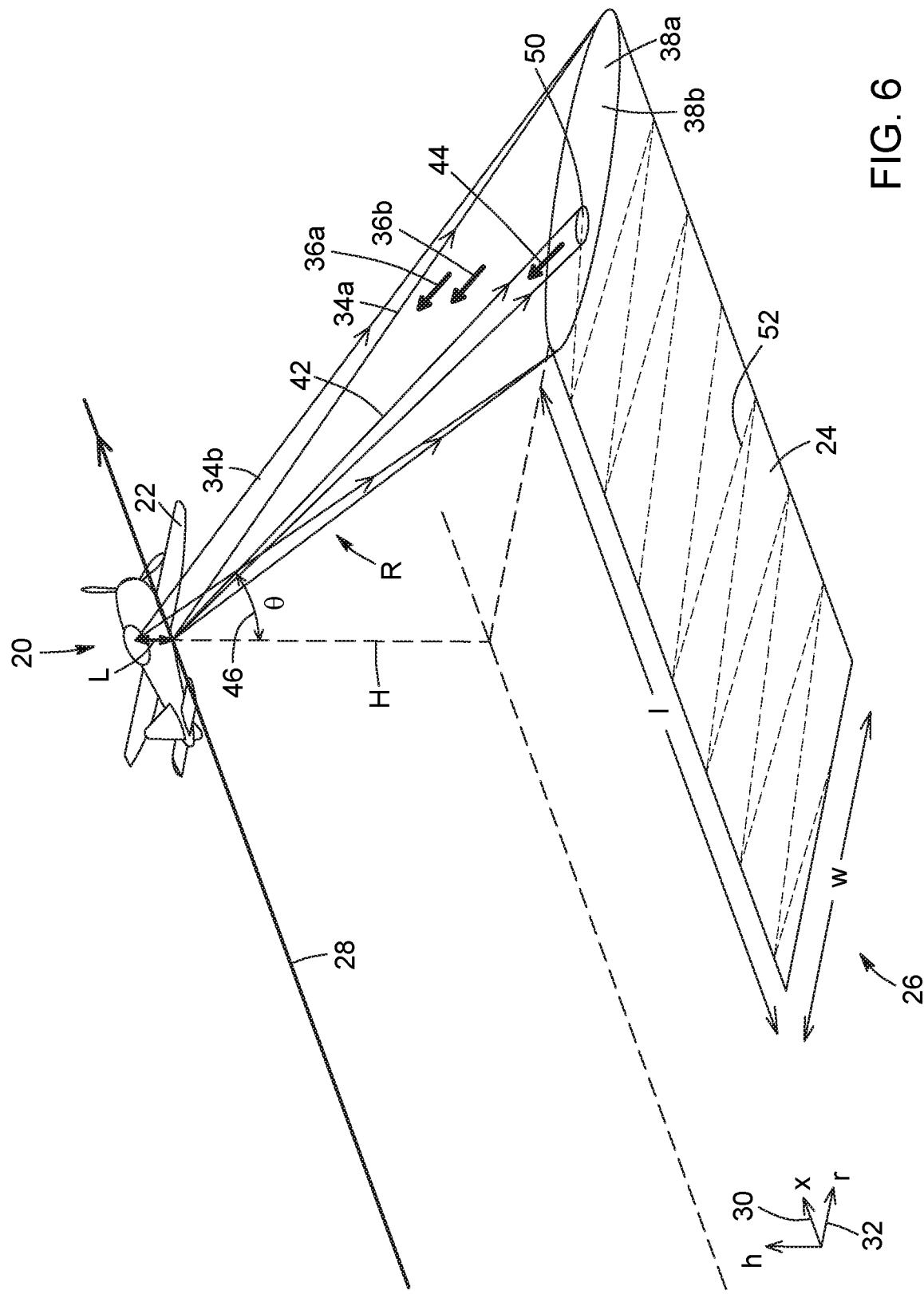
FIG. 6 is a schematic perspective view of an SA imaging system mounted on a platform in relative movement with respect to a target region and using single-pass interferometric SA imaging, in accordance with a possible embodiment.

In the embodiment of FIG. 6, the two 2D SA images to be combined into a phase-wrapped 3D SA image are acquired in a single-pass operation. The imaging system 20 concurrently projects two SA transmission beams 34a, 34b onto the target region 24 from two different vantage points on the platform 22 separated by a baseline distance L. In the illustrated embodiment, the footprint 38a of the first SA transmission beam 34a on the target region 24 coincides with the footprint 38b of the second SA transmission beam 34b. When this is not the case, the target region 24 is defined by the illumination swath resulting from the portions of the two footprints 38a, 38b that overlap.

Figure 7:
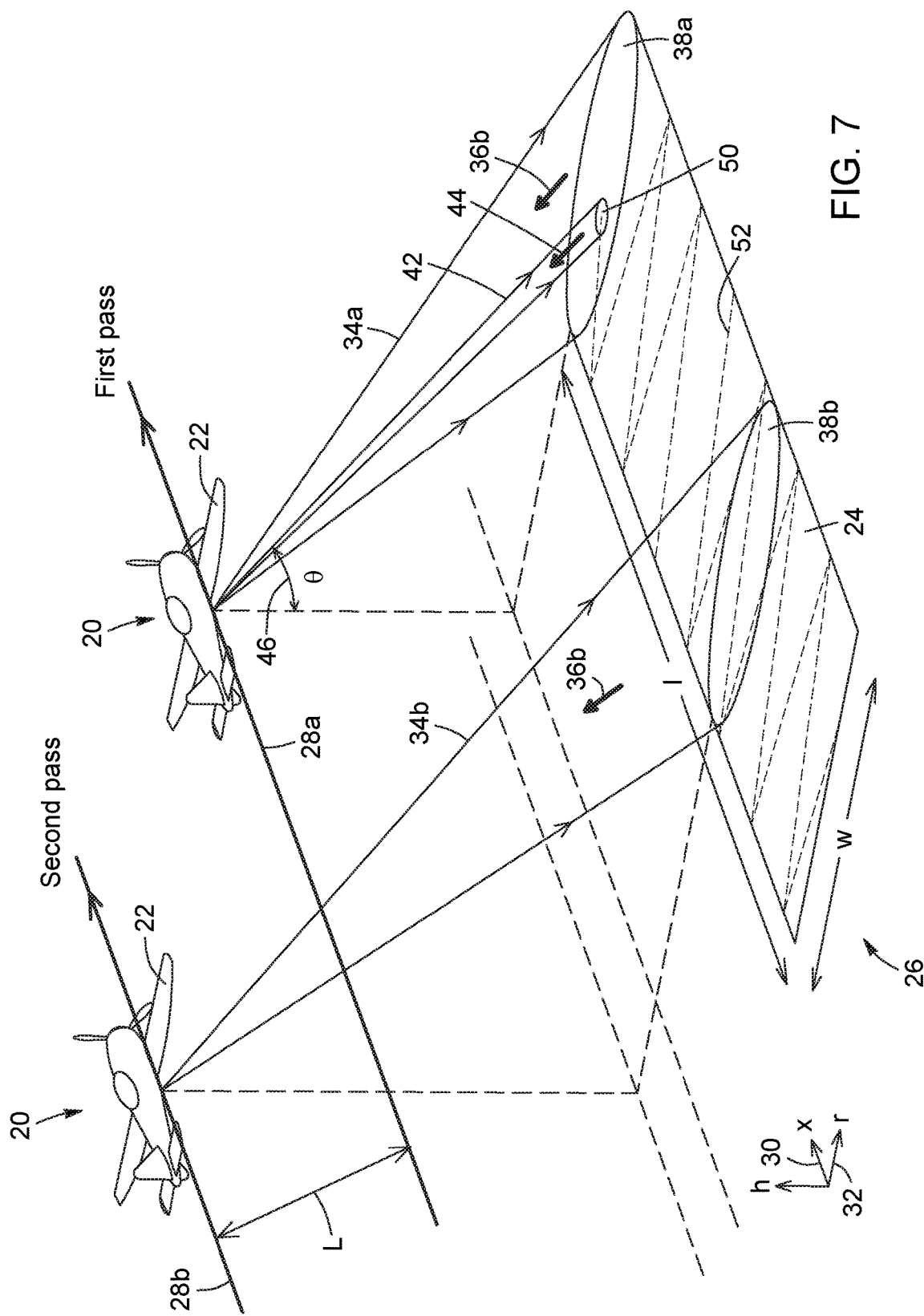
FIG. 7 is a schematic perspective view of an SA imaging system mounted on a platform in relative movement with respect to a target region and using multiple-pass interferometric SA imaging, in accordance with a possible embodiment.

Turning to FIG. 7, in other implementations the 2D images can be acquired in a multiple-pass operation. In FIG. 7, the imaging system 20 acquires a first 2D SA image from a first return signal 36a produced by reflection of a first SA transmission beam 34a from the target region 24 as the platform 22 moves along a first travel path 28a. The imaging system 20 then subsequently acquires a second 2D SA image from a second return signal 36b produced by reflection of a second SA transmission beam 34b from the target region 24 as the platform 22 moves along a second travel path 28b offset from the first travel path 28a by a baseline distance L. It is to be noted that the imaging system 20 of FIG. 7 can be embodied by those of FIGS. 2 and 4, if they are used in a multiple-pass configuration. In yet other implementations, some of the 2D images can be acquired concurrently, and some of the 2D images can be acquired at different times.

Returning to FIGS. 5 and 6, the method 300 further includes a step 306 of scanning, concurrently with the step 302 of acquiring the 2D SA images, the target region 24 with a scanning beam 42 transmitted from the platform 22, and a step 308 of receiving, on the platform 22, a scanning return signal 44 produced by reflection of the scanning beam 42 from the target region 24. The scanning of the target region 24 can be implemented with scanning lidar or another scanning-based ranging technology, and be performed with any suitable type of electromagnetic waves, for example a collimated laser beam. The method 300 also includes a step 310 of generating a 3D scanning image $S_{scan}(x, \theta)$ of the target region 24 from the scanning return signal 44, and a step 312 of determining an elevation map h(r, x) of the target region 24 from the 3D scanning image $S_{scan}(x, \theta)$. The scanning 306, receiving 308, generating 310 and determining 312 steps of the method 300 can share several features with like steps described above with respect to FIG. 1. It is to be noted that in single-pass implementations, such as in FIGS. 6 and 8, the scanning beam 42 is to be scanned over the target region 24 during this single pass. However, in multiple-pass implementations, such as in FIG. 7, the scanning beam 42 can be swept over the target region 24 during either one or more than one of the multiple passes. In the latter scenario, the plurality of 3D scanning images can be co-registered and averaged to provide a resulting 3D scanning image with improved quality.

Before describing how the elevation map h(r, x) of the target region 24 determined from the 3D scanning image $S_{scan}(x, \theta)$ can be used to improve the unwrapping of the phase-wrapped 3D SA image $S_{SA,3D,PW}(R, x)$, more detail will be provided about possible system implementations.

Figure 8:
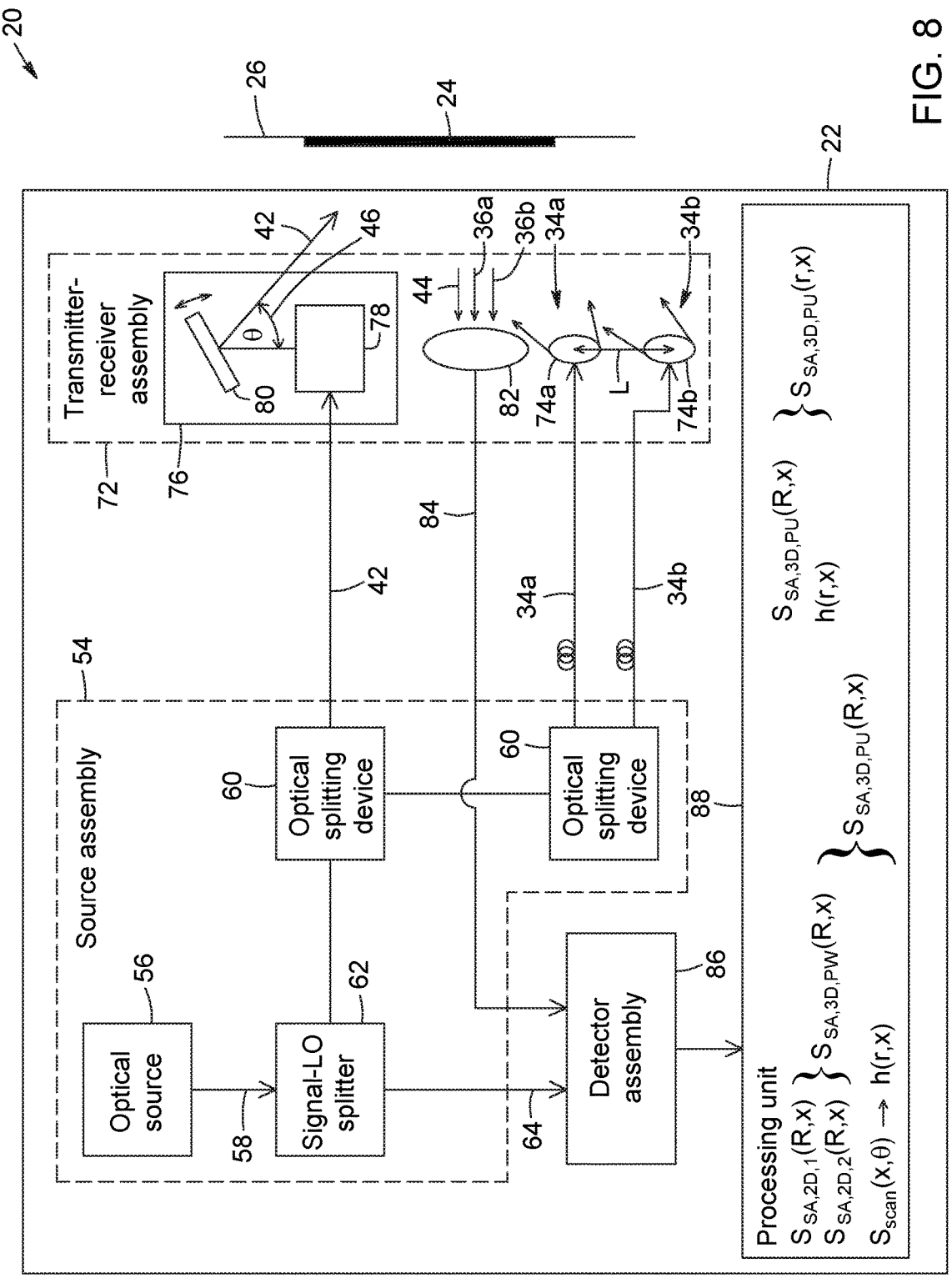
FIG. 8 is a schematic block diagram of another SA imaging system with beam scanning imaging capabilities, in accordance with a possible embodiment.

Referring to FIG. 8, there is provided a schematic block diagram of an embodiment of an imaging system 20 configured for IFSAL applications, and enabling 3D scanning imaging, for example scanning lidar technology. The block diagram of FIG. 8 shares several features with the block diagram of FIG. 4, which need not be described again in detail other than to highlight differences. The imaging system 20 of FIG. 8 includes a source assembly 54 mounted on the platform 22. The source assembly 54 includes an optical source 56 that generates a source optical signal 58, for example a linearly chirped pulsed laser signal. The source assembly 54 also includes optical splitting devices 60, 62 that split the source optical signal 58 into a first SA transmission beam 34a, a second SA transmission beam 34b, a scanning beam 42 and an LO signal 64, each of which inheriting the linear chirp waveform imparted to the source optical signal 58. In other embodiments, the number of optical sources and the number of optical splitting devices can be varied.

The imaging system 20 also includes a transmitter-receiver assembly 72. The transmitter-receiver assembly 72 includes first and second SA transmitters 74a, 74b mounted on the platform 22 and separated from each other by a baseline distance L. The first and second SA transmitters 74a, 74b are respectively configured to illuminate the target region 24 with the first and second SA transmission beams 34a, 34b. The transmitter-receiver assembly 72 also includes a scanning transmitter 76 including collimating optics 78 for collimating the scanning beam 42 and a scanning device 80 (e.g., a fast steering mirror) for scanning the target region 24 with the collimated scanning beam 42. The transmitter-receiver assembly 72 further includes a receiver unit 82 configured to receive, as a total return signal 84, a first SA return signal 36a, a second SA return signal 36b and a scanning return signal 44, respectively produced by reflection of the first SA transmission beam 34a, the second SA transmission beam 34b and the scanning beam 42 from the target region 24.

Referring still to FIG. 8, the imaging system 20 also includes a detector assembly 86 mounted on the platform 22. As in FIG. 4, the detector assembly 86 in FIG. 8 can use optical heterodyne detection to detect the first SA return signal 36a, the second SA return signal 36b and the scanning return signal 44 received by the receiver unit 82. The detector assembly 86 converts the detected return signals into electrical signals, which can be digitally sampled and stored as return signal data. The return signal data can be processed to extract first SA signal data associated with the first SA return signal 36a, second SA signal data associated with the second SA return signal 36b, and scanning signal data associated with the scanning return signal 44. The introduction of controlled relative time delays between the first SA transmission beam 34a, the second SA transmission beam 34b and the scanning beam 42 can facilitate discrimination of the first SA signal data, the second SA signal data and the scanning signal data from the return signal data.

The imaging system 20 of FIG. 8 can further include a processing unit 88 coupled to the detector assembly 86. The processing unit 88 is configured to reconstruct a first 2D SA image $S_{SA,2D,1}(R, x)$ of the target region 24 from the first SA signal data and a second 2D SA image $S_{SA,2D,2}(R, x)$ of the target region 24 from the second SA signal data. The first and second 2D SA images $S_{SA,2D,1}(R, x)$ and $S_{SA,2D,2}(R, x)$ each have an across-track dimension measured in slant-range coordinate R and an along-track coordinate measured in azimuth coordinate x. The processing unit 88 is also configured to co-register and combine the 2D SA images $S_{SA,2D,1}(R, x)$ and $S_{SA,2D,2}(R, x)$ to yield a phase-wrapped 3D SA image $S_{SA,3D,PW}(R, x)$. The processing unit 88 is further configured to generate a 3D scanning image $S_{scan}(x, \theta)$ of the target region 24 from the scanning signal data, and to determine an elevation map h(r, x) of the target region 24 from the 3D scanning image $S_{scan}(x, \theta)$.

Returning to the flow diagram of FIG. 5, the method 300 also includes a step 314 of unwrapping the phase-wrapped 3D SA image $S_{SA,3D,PW}(R, x)$ based on the elevation map h(r, x) to obtain a phase-unwrapped 3D SA image $S_{SA,3D,PU}(R, x)$. Phase unwrapping aims to resolve $2\pi c$ ambiguities in the phase-wrapped 3D SA image $S_{SA,3D,PW}(R, x)$ by determining a phase-unwrapped 3D SA image $S_{SA,3D,PU}(R, x)$ in which the wrapped phase values of the phase-wrapped 3D SA image $S_{SA,3D,PW}(R, x)$ are replaced by unambiguous elevation. It is to be noted that the general principles underlying phase unwrapping in SA imaging are known in the art and need not be covered in the detail herein.

In some implementations, the elevation profile h(r, x) determined from the 3D scanning image $S_{scan}(x, \theta)$ can be used as follows to assist the unwrapping of the phase-wrapped 3D SA image $S_{SA,3D,PW}(R, x)$. First, the elevation profile h(r, x) is co-registered with the phase-wrapped 3D SA image $S_{SA,3D,PW}(R, x)$ to provide pixel-to-pixel mapping between the two images. The co-registration can involve interpolating either the phase-wrapped 3D SA image $S_{SA,3D,PW}(R, x)$ or the elevation map h(r, x), typically the latter. The elevation map h(r, x) is next converted into a phase map from knowledge of the absolute position and orientation of the platform. This phase map is in turn subtracted from the phase-wrapped 3D SA image $S_{SA,3D,PW}(R, x)$ to achieve baseline removal, which provides coarse unwrapping of the phase-wrapped 3D SA image $S_{SA,3D,PW}(R, x)$. The phase unwrapping process can be completed with conventional phase unwrapping techniques such as path-following and least-squares algorithms. The unwrapped phase with resolved $2\pi$ ambiguities is then converted to elevation, and the previously subtracted baseline is added back to yield the phase-unwrapped 3D SA image $S_{SA,3D,PU}$ (R, x). The phase-unwrapped 3D SA image $S_{SA,3D,PU}$(R, x) can be represented as a 2D pixel array having an azimuth dimension x and a slant-range dimension R, and where each pixel has a value corresponding to the local elevation at the azimuth and slant-range coordinates of the pixel.

To project the phase-unwrapped 3D SA image $S_{SA,3D,PU}$ (R, x) in ground range, the method 300 of FIG. 5 can further include a step of orthorectifying the phase-unwrapped 3D SA image $S_{SA,3D,PU}$(R, x) to obtain an orthorectified phase-unwrapped 3D SA image $S_{SA,3D,PU}$(r, x). In some implementations, the elevation map used in the orthorectification process can be obtained from the phase-unwrapped 3D SA image $S_{SA,3D,PU}$(R, x) itself, which can facilitate image co-registration. In other implementations, the elevation map can alternatively be the elevation map h(r, x) determined from the 3D scanning image $S_{scan}$(x, $\theta$), as described above.

Of course, numerous modifications could be made to the embodiments described above without departing from the scope of the appended claims.

The invention claimed is:

1. A method for synthetic aperture (SA) imaging of a target region from a platform in relative movement with respect to the target region along a travel path, the method comprising:
generating a source optical signal and a local oscillator signal;
splitting the source optical signal, or a portion of the source optical signal, into an SA transmission beam and a scanning beam;
controlling an optical path length difference between the SA transmission beam and the scanning beam;
illuminating, from the platform, the target region with the SA transmission beam and receiving, on the platform, an SA return signal produced by reflection of the SA transmission beam from the target region;
scanning, from the platform, and concurrently with illuminating the target region with the SA transmission beam, the target region with the scanning beam and receiving, on the platform, a scanning return signal produced by reflection of the scanning beam from the target region;
mixing the SA return signal and the scanning return signal as a total return signal with the local oscillator signal using optical heterodyne detection to generate return signal data;
processing the return signal data based on the optical path length difference to obtain SA signal data associated with the SA return signal and scanning signal data associated with the scanning return signal;
generating an initial two-dimensional (2D) SA image of the target region from the SA signal data, the initial 2D SA image having an across-track dimension measured in slant-range coordinate;
generating a three-dimensional (3D) scanning image of the target region from the scanning signal data, and determining an elevation map of the target region from the 3D scanning image; and
orthorectifying the initial 2D SA image based on the elevation map to obtain an orthorectified 2D SA image having an across-track dimension measured in ground-range coordinate.

2. The method of claim 1, wherein generating the source optical signal comprises emitting the source optical signal as a series of laser pulses, and wherein splitting the source optical signal, or the portion thereof, into the SA transmission beam and the scanning beam comprises selecting a first number of the laser pulses to form the SA transmission beam and a second number of the laser pulses to form the scanning beam.

3. The method of claim 1, further comprising performing a linear chirp modulation of the source optical signal.

4. A system for synthetic aperture (SA) imaging of a target region from a platform in relative movement with respect to the target region along a travel path, the system comprising:
a source assembly mounted on the platform and configured to generate a source optical signal and a local oscillator signal, the source assembly comprising a splitter to split the source optical signal, or a portion of the source optical signal, into an SA transmission beam and a scanning beam having a controlled optical path length difference therebetween;
a transmitter-receiver assembly mounted on the platform and comprising:
an SA transmitter illuminating the target region with the SA transmission beam;
a scanning transmitter scanning the target region with the scanning beam; and
a receiver unit receiving, as a total return signal, an SA return signal and a scanning return signal, respectively produced by reflection of the SA transmission beam and the scanning beam from the target region;
a detector assembly mounted on the platform and configured to mix the total return signal with the local oscillator signal using optical heterodyne detection to generate return signal data; and
a processing unit coupled to the detector assembly and configured to:
process the return signal data based on the optical path length difference to obtain SA signal data associated with the SA return signal and scanning signal data associated with the scanning return signal;
generate an initial two-dimensional (2D) SA image of the target region from the SA signal data, the initial 2D SA image having an across-track dimension measured in slant-range coordinate;
generate a three-dimensional (3D) scanning image of the target region from the scanning signal data;
determine an elevation map of the target region from the 3D scanning image; and
orthorectify the initial 2D SA image based on the elevation map to obtain an orthorectified 2D SA image having an across-track dimension measured in ground-range coordinate.

5. The system of claim 4, wherein the source assembly is configured to perform a linear chirp modulation of the source optical signal.

6. The system of claim 4, wherein the source assembly generates the source optical signal as a series of laser pulses, and wherein the splitter selects a first number of the laser pulses to form the SA transmission beam and a second number of the laser pulses to form the scanning beam.

7. The system of claim 4, wherein each one of the SA transmission beam and the scanning beam has a center frequency ranging from 30 terahertz to 300 terahertz.

8. A method for synthetic aperture (SA) imaging of a target region from a platform in relative movement with respect to the target region along a travel path, the method comprising:
generating at least one SA transmission beam, a scanning beam, and a local oscillator signal;

controlling an optical path length difference between the at least one SA transmission beam and the scanning beam;

illuminating, from the platform, the target region with the at least one SA transmission beam, and receiving, on the platform, at least one SA return signal produced by reflection of the at least one SA transmission beam from the target region;

scanning, from the platform and concurrently with illuminating the target region with the at least one SA transmission beam, the target region with the scanning beam and receiving, on the platform, a scanning return signal produced by reflection of the scanning beam from the target region;

mixing the at least one SA return signal and the scanning return signal as a total return signal with the local oscillator signal using optical heterodyne detection to generate return signal data:

processing the return signal data based on the optical path length difference to obtain SA signal data associated with the at least one SA transmission beam and scanning signal data associated with the scanning return signal;

generating two or more two-dimensional (2D) SA images of the target region from the SA signal data, and combining the two or more 2D SA images to obtain a phase-wrapped three-dimensional (3D) SA image of the target region;

generating a 3D scanning image of the target region from the scanning signal data, and determining an elevation map of the target region from the 3D scanning image; and unwrapping the phase-wrapped 3D SA image based on the elevation map to obtain a phase-unwrapped 3D SA image.

9. The method of claim 8, wherein generating the two or more 2D SA images is performed in a single pass of the platform over the target region.

10. The method of claim 8, further comprising generating the at least one SA transmission beam, the scanning beam, and the local oscillator signal with a linear chirp modulation imparted thereto.

11. The method of claim 8, wherein generating the two or more 2D SA images is performed in multiple passes of the platform over the target region.

12. The method of claim 8, comprising orthorectifying the phase-unwrapped 3D SA image.

13. A system for synthetic aperture (SA) imaging of a target region from a platform in relative movement with respect to the target region along a travel path, the system comprising:

a source assembly mounted on the platform and configured to generate a source optical signal and a local oscillator signal, the source assembly comprising a splitter configured to split the source optical signal, or a portion of the source optical signal, into a first SA transmission beam, a second SA transmission beam and a scanning beam having controlled optical path length differences therebetween;

a transmitter-receiver assembly mounted on the platform and comprising:
 a first SA transmitter illuminating the target region with the first SA transmission beam, and a second SA transmitter illuminating the target region with the second SA transmission beam, the second SA transmitter being separated from the first SA transmitter by a baseline distance;
 a scanning transmitter scanning the target region with the scanning beam; and
 a receiver unit receiving, as a total return signal, a first SA return signal, a second SA return signal and a scanning return signal, respectively produced by reflection of the first SA transmission beam, the second SA transmission beam and the scanning beam from the target region;

a detector assembly mounted on the platform and configured to mix the total return signal with the local oscillator signal using optical heterodyne detection to generate return signal data; and a processing unit coupled to the detector assembly and configured to:
 process the return signal data based on the optical path length differences to obtain first SA signal data and second SA signal data respectively associated with the first and second SA transmission beams, and scanning signal data associated with the scanning return signal;
 generate first and second two-dimensional (2D) SA images of the target region respectively from the first SA signal data and the second SA signal data, and combine the first and second 2D SA images to obtain a phase-wrapped three-dimensional (3D) SA image of the target region;
 generate a 3D scanning image of the target region from the scanning signal data, and determine an elevation map of the target region from the 3D scanning image; and
 unwrap the phase-wrapped 3D SA image based on the elevation map to obtain a phase-unwrapped 3D SA image.

14. The system of claim 13, wherein the source assembly is configured to perform a linear chirp modulation of the source optical signal.

15. The system of claim 13, wherein each one of the first and second SA transmission beams and the scanning beam has a center frequency ranging from 30 terahertz to 300 terahertz.

* * * * *